US 6,535,336 B2

(12) United States Patent
Tatsumi

(10) Patent No.: US 6,535,336 B2
(45) Date of Patent: Mar. 18, 2003

(54) HIGH REFLECTION MIRROR

(75) Inventor: Shumpei Tatsumi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/862,587

(22) Filed: May 23, 2001

(65) Prior Publication Data

US 2002/0008914 A1 Jan. 24, 2002

(30) Foreign Application Priority Data

Jun. 2, 2000 (JP) ......... 2000-165293
Jun. 2, 2000 (JP) ......... 2000-165308
Apr. 4, 2001 (JP) ......... 2001-105845

(51) Int. Cl.⁷ ................................ G02B 1/10
(52) U.S. Cl. ......................... 359/584; 359/585
(58) Field of Search .................. 359/584, 585, 359/586, 588, 589, 359, 360, 883

(56) References Cited

U.S. PATENT DOCUMENTS 5,216,551 A * 6/1993 Fujii .................. 359/884
5,424,876 A * 6/1995 Fujii .................. 359/884

FOREIGN PATENT DOCUMENTS

| JP | 52-40348 | 3/1977 |
| JP | 02-109003 | 4/1990 |
| JP | 11-64612 | 3/1999 |

* cited by examiner

Primary Examiner—Cassandra Spyrou
Assistant Examiner—Alessandro V. Amari
(74) Attorney, Agent, or Firm—Fitzpatrick, Cella, Harper & Scinto

(57) ABSTRACT

A high reflection mirror has a layer structure comprising on a substrate, a $TiO_x$ layer, an Ag layer, an $Al_2O_3$ layer and a $TiO_2$ layer in this order, or alternatively on a substrate, an $SiO_x$ layer, a Cr layer, an Ag layer, an $Al_2O_3$ layer and a $TiO_2$ layer in this order ($1 \leq x \leq 2$). An $SiO_y$ protective layer may be formed on the top $TiO_2$ layer ($1 \leq y \leq 2$). The high reflection mirror shows a high reflectance and a high durability and can be produced at a lower cost because of the reduced number of layers.

9 Claims, 4 Drawing Sheets

HIGH REFLECTION MIRROR

BACKGROUND OF THE INVENTION

1. Field of the Invention

This invention relates to a high reflection mirror designed to exploit the characteristic features of metal film. More specifically, it relates to a high reflection mirror comprising a minimal number of films and showing an excellent adhesiveness and a good corrosion-resistance that can be manufactured with a high productivity and suitably used for a sophisticated optical device such as a camera, a copying machine or a printer.

2. Related Background Art

Japanese Patent Application Laid-Open No. 2-109003 discloses a reflection mirror of the type under consideration comprising a substrate, an intermediary layer of a metal oxide formed on the substrate, a metal reflection film laid on the intermediary layer and, if necessary, a protection film laid on the metal reflection film. If the protection film is made to increase reflection, not less than six layers of a material having a low refractive index and a material showing a high refractive index have to be laid, which leads to a long film forming process and a low productivity. Additionally, it has been proved by durability tests and other tests that such a reflection increasing arrangement can reduce the reflectance and some of its layers can peel off and become suspended, degrading the film, due to the intertwined complex internal stresses of the multilayer film.

Additionally, while the use of silicon oxide or magnesium fluoride is proposed for the low refractive index material, such compounds are not without problems from the viewpoint of durability and stability of the formed film.

Meanwhile, Japanese Patent Application Laid-Open No. 11-64612 discloses a reflection mirror realized by inserting an $SiO_2$ layer between the base layer and the Ag layer. Japanese Patent Application Laid-Open No. 52-40348 discloses a reflection mirror realized by inserting an SiO layer between a plastic substrate and a metal film. However, the adhesion of an Ag layer and an $SiO_2$ layer and that of an Ag layer and an SiO layer are not particularly good and long constant-temperature-humidity tests have also proved that, when an reflection increasing layer having a large internal stress is laid on an Ag layer, it can peel off and become suspended, or cracks can appear.

SUMMARY OF THE INVENTION

In view of these circumstances, it is therefore an object of the present invention to dissolve the above identified problems of the prior art by providing a high reflection mirror that shows a high reflectance and an excellent corrosion-resistance as well as a good adhesiveness relative to a glass substrate and a plastic substrate and can be manufactured with a reduced total number of films to improve the productivity.

According to the invention, the above object is achieved by providing a high reflection mirror comprising:

a substrate;

a $TiO_x$ layer formed on the substrate, where $1 \leq x \leq 2$;

an Ag layer formed on the $TiO_x$ layer;

an $Al_2O_3$ layer formed on the Ag layer; and a $TiO_2$ layer formed on the $Al_2O_3$ layer.

In another aspect of the invention, there is provided a high reflection mirror comprising:

a substrate;

a $SiO_x$ layer formed on the substrate, where $1 \leq x \leq 2$;

a Cr layer formed on the $SiO_x$ layer;

an Ag layer formed on the Cr layer;

an $Al_2O_3$ layer formed on the Ag layer; and a $TiO_2$ layer formed on the $Al_2O_3$ layer.

DESCRIPTION OF THE PREFERRED EMBODIMENTS

Now, the present invention will be described in greater detail by referring to the accompanying drawings that illustrate preferred embodiments of the invention.

Figure 1:
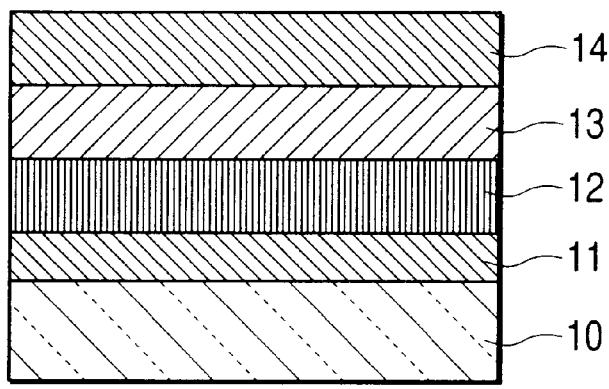
FIG. 1 is a schematic cross sectional view of a first embodiment of high reflection mirror according to the invention.

FIG. 1 is a schematic cross sectional view of a first embodiment of high reflection mirror according to the invention. Referring to FIG. 1, substrate 10 is made of a material that is conventionally used for optical elements and may be a glass substrate, or a (plastic) resin substrate such as a polycarbonate substrate or an acryl substrate.

A $TiO_x$ layer 11 is produced by using $TiO_2$ or TiO as starting material and laid on the substrate 10. Note that $1 \leq x \leq 2$ here. Oxygen may or may not be introduced in the film forming process. The undercoat is used to improve the adhesion of the layer relative to the Ag layer 12 to be formed thereon subsequently and also the corrosion-resistance of the finished high reflection mirror. It is sufficient for the undercoat to have a film thickness of $\lambda/4$ ($\lambda$: design dominant wavelength) because, with such a film thickness, it does not practically give rise to the problem of a reduced reflectance in the short wavelength range, although such a problem has been a subject of apprehension.

An Ag layer 12 is formed on the undercoat of said $TiO_x$ layer 11. While the Ag layer 12 can be formed by using an ordinary resistance heating process, the use of an electron beam (EB) evaporation technique can remarkably reduce the time required for forming the film. A film thickness between 100 and 300 nm will be appropriate for the layer.

Then, an $Al_2O_3$ layer 13 is formed on the Ag layer 12. The $Al_2O_3$ layer 13, which is the third layer, operates as protection layer with a $TiO_2$ layer 14 to be formed thereon as the fourth layer and also as low refractive index dielectric layer for a reflection increasing arrangement.

As is well known, an $Al_2O_3$ layer is a dense film and hence can be formed as a stable film layer that is highly resistive against moisture and scratches. An ordinary film forming technique such as vacuum evaporation or sputtering can be used for forming the $Al_2O_3$ layer 13.

As pointed out above, a $TiO_2$ layer 14 is formed on the $Al_2O_3$ layer 13 as high refractive index dielectric layer for a reflection increasing arrangement. Since a $TiO_2$ layer can be made to show a high refractive index at room temperature without heating the substrate, a satisfactory reflection increasing effect can be achieved by a two-layered arrangement of laying a $TiO_2$ layer on an $Al_2O_3$ layer. In this way, a high reflection mirror showing a very high reflectance can be realized to fully exploit the high reflection characteristics of the Ag layer 12.

Figure 2:
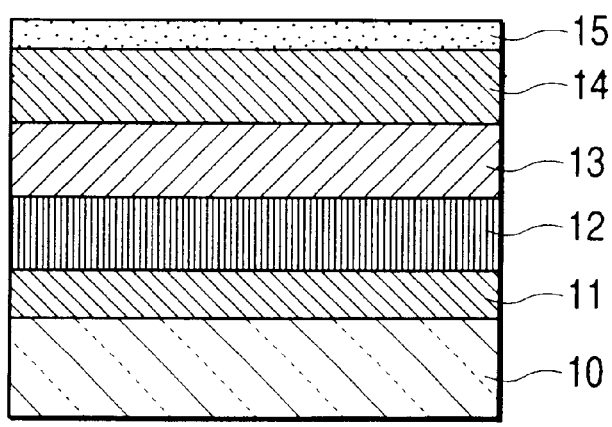
FIG. 2 is a schematic cross sectional view of a second embodiment of high reflection mirror according to the invention.

FIG. 2 is a schematic cross sectional view of a second embodiment of high reflection mirror according to the invention. In FIG. 2, components the same as those of FIG. 1 are denoted respectively by the same reference symbols and will not be described any further. As seen from FIG. 2, if necessary, an $SiO_y$ ($1 \leq y \leq 2$) layer 15 may additionally be formed on the $TiO_2$ layer 14. The $SiO_y$ layer 15 preferably has a small film thickness so that it may not influence the spectral characteristics of the high reflection mirror. The durability of the prepared mirror can be further improved by forming an $SiO_y$ layer 15 as a top layer.

The first and second embodiments have a total number of film layers as small as 4 and 5 respectively. Therefore, such high reflection mirrors can be manufactured with a high productivity. Thus, according to the invention, it is possible to provide a durable high reflection mirror that shows a high reflectance and a good adhesiveness relative to a resin substrate that cannot be heated without problem and is adapted to exploit the characteristics of a high reflectance metal film. As a specific instance, according to the invention, it is possible to provide a durable high reflection Ag mirror that shows a high reflectance of 97% or more in the visible wavelength range.

Example 1

In this example, a high reflection mirror having a configuration as shown in FIG. 1 was prepared in a manner as described below. After cleansing a polycarbonate substrate 10 by blowing nitrogen, the substrate 10 was put in a vacuum evaporation system and the inside was evacuated to the pressure level of $1 \times 5 \ 10^{-4}$ Pa. Then, oxygen gas was introduced into the system by way of a reaction gas introduction line to regulate the internal pressure to the level of $1 \times 10^{-2}$ Pa and a $TiO_x$ layer ($TiO_2$ layer in this example) 11 was formed to a thickness of 125 nm by heating $TiO_2$ by means of an electron gun under this pressure level. Thereafter, an Ag layer 12 was formed to a film thickness of 150 nm by heating Ag by means of EB heating. Subsequently, the internal pressure was regulated again to the level of $1 \times 10^{-2}$ Pa also by introducing oxygen gas and $Al_2O_3$ was deposited to a thickness of $\lambda_1/4$ ($\lambda_1$: design dominant wavelength) by means of an electron gun under this pressure level to produce an $Al_2O_3$ layer 13. Then, $TiO_2$ was deposited thereon as in the case of the $Al_2O_3$ layer 13 under the same pressure level to a thickness of $\lambda_2/4$ ($\lambda_2$: design dominant wavelength) also by means of an electron gun to produce a $TiO_2$ layer 14. All of the above described operations of forming the undercoat, the Ag film and the reflection increasing film were performed continuously without heating the substrate. While the design dominant wavelength is expressed by $\lambda_1$ and $\lambda_2$ in the above description in order to discriminate the respective film forming steps, they are normally equal to each other.

Figure 3:
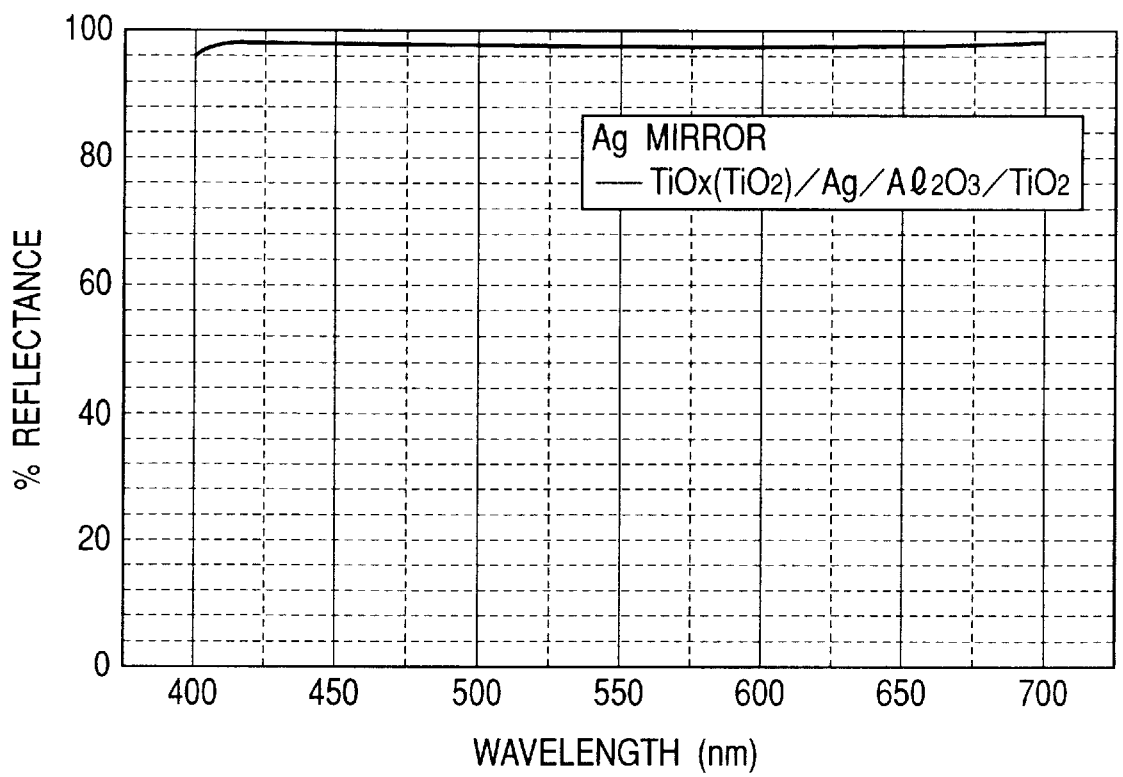
FIG. 3 is a graph showing the spectral characteristics of the reflectance as observed in Example 1.

FIG. 3 shows the spectral characteristics of the reflectance of the high reflection mirror prepared in this example. As seen from FIG. 3, it was confirmed that the reflectance was higher than 97% in the wavelength range between 400 and 700 nm. In FIG. 3, the horizontal axis represents the wavelength (nm) and the vertical axis represents the reflectance (%).

Example 2

A high reflection mirror having a configuration as shown in FIG. 2 was prepared in a manner as described below. A $TiO_x$ layer ($TiO_2$ layer in this example) 11, an Ag layer 12, an $Al_2O_3$ layer 13 and a $TiO_2$ layer 14 were sequentially laid on a polycarbonate substrate 10 by following the process of Example 1. Then, an $SiO_y$ layer was formed on the $TiO_2$ layer 14 to a film thickness of 10 nm.

Comparative Example 1

Figure 4:
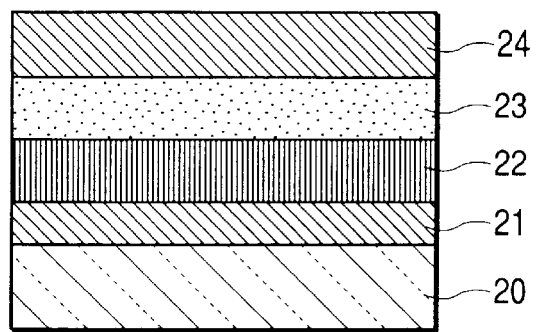
FIG. 4 is a schematic cross sectional view of the high reflection mirror prepared in Comparative Example 1.

A high reflection mirror having a configuration as shown in FIG. 4 was prepared in a manner as described below. Firstly, a $TiO_x$ layer ($TiO_2$ layer in this example) 21 and an Ag layer 22 were formed on a polycarbonate substrate 20 as in Example 1. Then, $SiO_2$ was deposited thereon by EB evaporation to a thickness of $\lambda_1/4$ to produce an $SiO_2$ layer 23. Then, a $TiO_2$ layer 24 was formed as in Example 1.

Both the specimen of Example 1 and that of Example 2 were rated high in terms of reflectance after a durability test conducted in a constant-temperature-humidity condition and also in terms of adhesion effect observed in a tape test. Additionally, they did not show any problems such as a clouded appearance, film fissures and/or a peeled film.

On the other hand, the Ag layer 22 and the $SiO_2$ layer 23 of Comparative Example 1 separated easily from each other in an adhesion effect test conducted after a durability test to prove that it was defective in terms of adhesion effect. Table 1 below summarily shows the results of the constant-temperature-humidity test.

TABLE 1

| | CONSTANT-TEMPERATURE-HUMIDITY TEST | | | |
|---|---|---|---|---|
| | ADHESION (TAPE TEST) | CLOUDED? | CRACKED? | PEELED? |
| EX. 1 | good | no | no | no |
| EX. 2 | good | no | no | no |
| COMP. EX. 1 | poor | no | no | no |
| EX. 3 | good | no | no | no |
| EX. 4 | good | no | no | no |
| COMP. EX. 2 | poor | no | no | yes |

Figure 5:
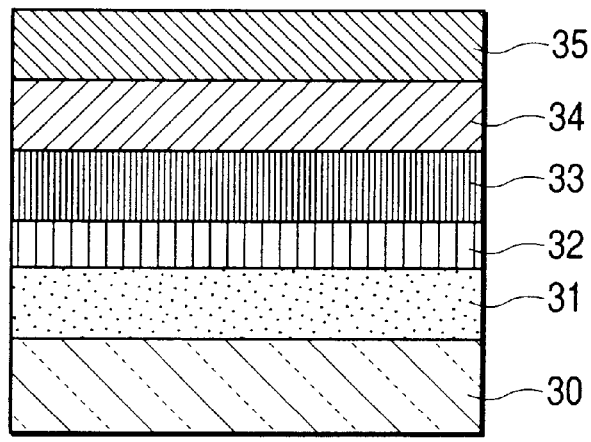
FIG. 5 is a schematic cross sectional view of a third embodiment of high reflection mirror according to the invention.

FIG. 5 is a schematic cross sectional view of a third embodiment of high reflection mirror according to the invention. Referring to FIG. 5, substrate 30 is made of a material that is conventionally used for optical elements and may be a glass substrate, or a (plastic) resin substrate such as a polycarbonate substrate or an acryl substrate.

An $SiO_x$ layer 31 is produced on the substrate 30 by using SiO as starting material, with introducing oxygen during the film forming process, and laid on the substrate 30. Then a thin Cr layer 32 is formed thereon. The undercoat of these layers is formed to improve the adhesion of the layer relative to the Ag layer 33 to be formed thereon subsequently and also the corrosion-resistance of the finished high reflection mirror. It is desirable for the $SiO_x$ layer 31 of the undercoat to have a film thickness of $\lambda/2$ ($\lambda$: design dominant wavelength). The Cr layer 32 is used to intensify the adhesion relative to the Ag layer 33 and it is sufficient for it to have a film thickness of about 1 to 50 nm because, with such a film thickness, it does not give rise to the problem of a reduced reflectance in the short wavelength range, although such a problem has been a subject of apprehension.

An Ag layer 33 is formed on the undercoat of the $SiO_x$ layer 31 and the Cr layer 32. While the Ag layer 33 can be formed by using an ordinary resistance heating process, the use of an electron beam (EB) evaporation technique can remarkably reduce the time required for forming the film. A film thickness between 100 and 300 nm will be appropriate for the layer.

Then, an $Al_2O_3$ layer 34 is formed on the Ag layer 33. The $Al_2O_3$ layer 34 operates as protection layer with a $TiO_2$ layer 35 to be formed thereon and also as low refractive index dielectric layer for a reflection increasing arrangement.

As is well known, an $Al_2O_3$ layer 34 is a dense film and hence can be formed as a stable film layer that is highly resistive against moisture and scratches. An ordinary film forming technique such as vacuum evaporation or sputtering can be used for forming the $Al_2O_3$ layer 34.

A $TiO_2$ layer 35 is formed on the $Al_2O_3$ layer 34 as high refractive index dielectric layer for a reflection increasing arrangement. Since a $TiO_2$ layer can be made to show a high refractive index at room temperature without heating the substrate, a satisfactory reflection increasing effect can be achieved by a two-layered arrangement of laying a $TiO_2$ layer 35 on an $Al_2O_3$ layer 34. In this way, a high reflection mirror showing a very high reflectance can be realized to fully exploit the high reflection characteristics of the Ag layer 33.

Figure 6:
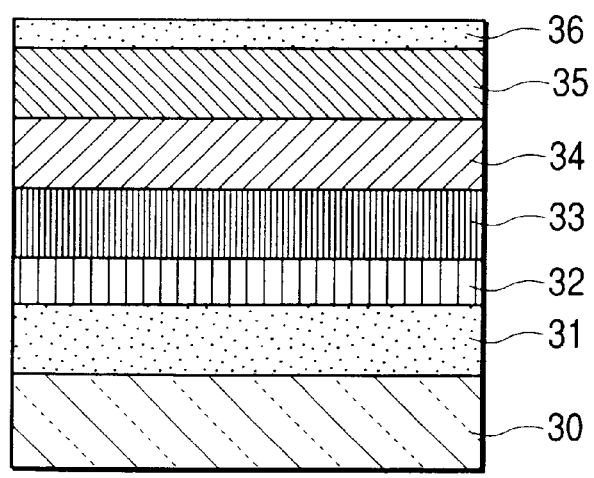
FIG. 6 is a schematic cross sectional view of a fourth embodiment of high reflection mirror according to the invention.

FIG. 6 is a schematic cross sectional view of a fourth embodiment of high reflection mirror according to the invention. In FIG. 6, components the same as those of FIG. 5 are denoted by the same reference symbols, respectively, and will not be described any further. As seen from FIG. 6, if necessary, an $SiO_y$ layer 36 may additionally be formed on the $TiO_2$ layer 35. The $SiO_y$ layer 36 preferably has a small film thickness of 1 to 10 nm so that it may not influence the spectral characteristics of the high reflection mirror. The durability of the prepared mirror can be further improved by forming an $SiO_y$ layer 36 as a top layer.

The third and fourth embodiments have a total number of film layers as small as 5 and 6 respectively. Therefore, such high reflection mirrors can be manufactured with a high productivity. Thus, according to the invention, it is possible to provide a durable high reflection mirror that shows a high reflectance and a good adhesiveness relative to a resin substrate that cannot be heated without problem and is adapted to exploit the characteristics of a high reflectance metal film. As a specific instance, according to the invention, it is possible to provide a durable high reflection Ag mirror that shows a high reflectance of 97% or more in the visible wavelength range.

Example 3

In this example, a high reflection mirror having a configuration as shown in FIG. 5 was prepared in a manner as described below. After cleansing a polycarbonate substrate 30 by blowing nitrogen, the substrate 30 was put in a vacuum evaporation system and the inside was evacuated to the pressure level of $1 \times 10^{-3}$ Pa. Then, oxygen gas was introduced into the system by way of a reaction gas introduction line to regulate the internal pressure to the level of $1.06 \times 10^{-2}$ Pa and an $SiO_x$ layer 31 was formed to an optical thickness of $\lambda_1/4$ ($\lambda_1$: design dominant wavelength) by heating SiO by means of resistance heating under this pressure level. Subsequently, a Cr layer 32 was formed to a film thickness of 20 nm by EB heating. Thereafter, an Ag layer 33 was formed to a film thickness of 150 nm by heating Ag by means of EB heating. Then, the internal pressure was regulated again to the level of $1 \times 10^{-2}$ Pa also by introducing oxygen gas and $Al_2O_3$ was deposited to a thickness of $\lambda_2/4$ ($\lambda_2$: design dominant wavelength) by means of an electron gun under this pressure level to produce an $Al_2O_3$ layer 34. Then, $TiO_2$ was deposited thereon as in the case of the $Al_2O_3$ layer 34 under the same pressure level to a thickness of $\lambda_3/4$ ($\lambda_3$: design dominant wavelength) also by means of an electron gun to produce a $TiO_2$ layer 35. All the above described operations of forming the undercoat, the Ag film and the reflection increasing film were performed continuously without heating the substrate. While the design dominant wavelength is expressed by $\lambda_1$, $\lambda_2$ and $\lambda_3$ in the above description in order to discriminate the respective film forming steps, they are normally equal to each other.

Figure 7:
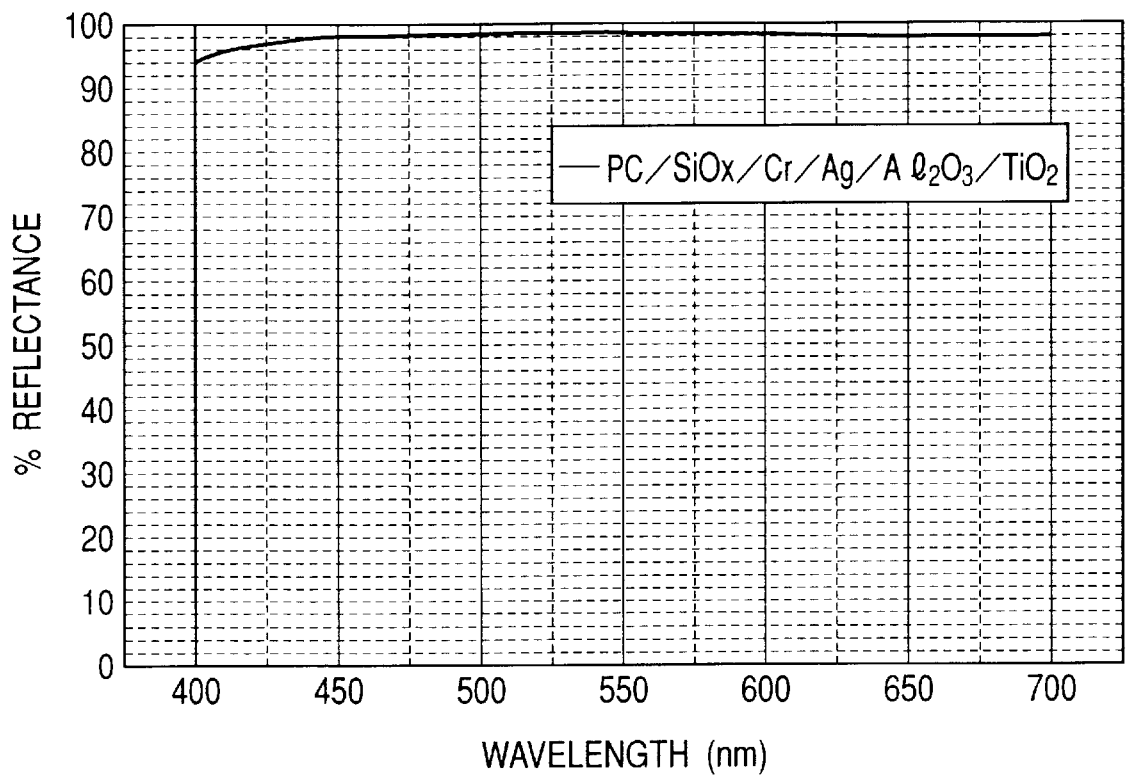
FIG. 7 is a graph showing the spectral characteristics of the reflectance as observed in Example 3.

FIG. 7 shows the spectral characteristics of the reflectance of the high reflection mirror prepared in this example. As seen from FIG. 7, it was confirmed that the reflectance was higher than 97% in the wavelength range between 400 and 700 nm. In FIG. 7, the horizontal axis represents the wavelength (nm) and the vertical axis represents the reflectance (%).

Example 4

A high reflection mirror having a configuration as shown in FIG. 6 was prepared in a manner as described below. An $SiO_x$ layer 31, a Cr layer 32, an Ag layer 33, an $Al_2O_3$ layer 34 and a $TiO_2$ layer 35 were sequentially laid on a polycarbonate substrate 30 by following the process of Example 3. Then, an $SiO_y$ layer 36 was formed on the $TiO_2$ layer 35 to a film thickness of 10 nm.

Comparative Example 2

Figure 8:
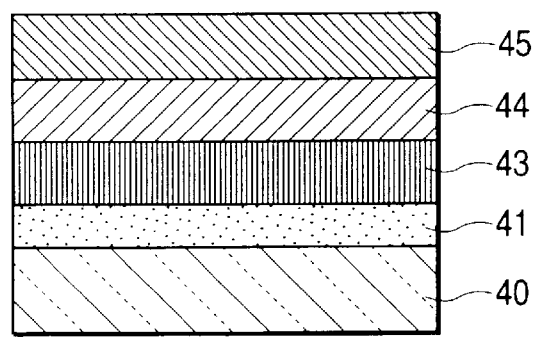
FIG. 8 is a schematic cross sectional view of the high reflection mirror prepared in Comparative Example 2.

A high reflection mirror having a configuration as shown in FIG. 8 was prepared in a manner as described below. Firstly, an $SiO_x$ layer 41, an Ag layer 43, an $Al_2O_3$ layer 44 and a $TiO_2$ layer 45 were formed on a polycarbonate substrate 40 as in Example 3 but no Cr layer was formed. As a result, a four-layered high reflection mirror was prepared.

Both the specimen of Example 3 and that of Example 4 were rated high in terms of reflectance after a durability test conducted in a constant-temperature-humidity condition and also in terms of adhesion effect observed in a tape test. Additionally, they did not show any problems such as a clouded appearance, film fissures and/or a peeled film.

On the other hand, the Ag layer 43 and the $SiO_x$ layer 41 of Comparative Example 2 showed significant suspension or peel-off and separated easily from each other in an adhesion effect test conducted after a durability test to prove that it was defective in terms of adhesion effect. Table 1 above also summarily shows the results of the constant-temperature-humidity test conducted on these specimens.

As described above, a high reflection mirror according to the invention shows a high reflectance and a high durability and can be manufactured at low cost to improve the productivity because the total number of film layers is remarkably reduced.

What is claimed is:

1. A high reflection mirror comprising:
   a substrate;
   a $TiO_x$ layer formed on the substrate, where $1 \leq x \leq 2$;
   an Ag layer formed directly on the $TiO_x$ layer;
   an $Al_2O_3$ layer formed on the Ag layer; and
   a $TiO_2$ layer formed directly on the $Al_2O_3$ layer.

2. A high reflection mirror according to claim 1, further comprising:
   an $SiO_y$ layer formed on said $TiO_2$ layer, where $1 \leq y \leq 2$.

3. A high reflection mirror according to claim 2, wherein said $SiO_y$ layer has a film thickness of 1 to 10 nm.

4. A high reflection mirror according to claim 1, wherein the reflectance relative to light with a visible wavelength range is not less than 97%.

5. A high reflection mirror according to claim 1, wherein said $TiO_x$ layer, said Ag layer, said $Al_2O_3$ layer and said $TiO_2$ layer are formed without heating the substrate.

6. A high reflection mirror according to claim 1, wherein said $TiO_x$ layer has a film thickness of $\lambda/4$, where $\lambda$ represents a design dominant wavelength.

7. A high reflection mirror according to claim 1, wherein said Ag layer has a film thickness of 100 to 300 nm.

8. A high reflection mirror according to claim 1, wherein said $Al_2O_3$ layer has a film thickness of $\lambda/4$, where $\lambda$ represents a design dominant wavelength.

9. A high reflection mirror according to claim 1, wherein said $TiO_2$ layer has a film thickness of $\lambda/4$, where $\lambda$ represents a design dominant wavelength.

* * * * *